US011896986B2

(12) United States Patent
Qiao et al.

(10) Patent No.: US 11,896,986 B2
(45) Date of Patent: Feb. 13, 2024

(54) NOZZLE DEVICE APPLIED TO HIGH-PRESSURE CLEANING MACHINE AND HANDHELD HIGH-PRESSURE CLEANING MACHINE

(71) Applicant: Positec Power Tools (Suzhou) Co., Ltd, Suzhou (CN)

(72) Inventors: Yong Qiao, Suzhou (CN); Qibin Wang, Suzhou (CN); Yajie Cheng, Suzhou (CN)

(73) Assignee: Positec Technology China Co. Ltd., JiangSu (CN)

( * ) Notice: Subject to any disclaimer, the term of this patent is extended or adjusted under 35 U.S.C. 154(b) by 528 days.

(21) Appl. No.: 17/271,924

(22) PCT Filed: Aug. 26, 2019

(86) PCT No.: PCT/CN2019/102427
§ 371 (c)(1),
(2) Date: Feb. 26, 2021

(87) PCT Pub. No.: WO2020/043032
PCT Pub. Date: Mar. 5, 2020

(65) Prior Publication Data

US 2021/0316324 A1 Oct. 14, 2021

(30) Foreign Application Priority Data

Aug. 28, 2018 (CN) ......................... 201810989402.7

(51) Int. Cl.
*B05B 12/08* (2006.01)
*B05B 9/01* (2006.01)
(Continued)

(52) U.S. Cl.
CPC .............. *B05B 12/087* (2013.01); *B05B 9/01* (2013.01); *B05B 9/04* (2013.01); *B08B 3/026* (2013.01);
(Continued)

(58) Field of Classification Search
CPC ........... B05B 12/087; B05B 9/01; B05B 9/04; B08B 3/026; B08B 2203/0211; B08B 2203/027
(Continued)

(56) References Cited

U.S. PATENT DOCUMENTS 3,885,739 A * 5/1975 Tuttle ........................ B05B 9/01
239/124
7,753,059 B2 7/2010 Hasegawa
(Continued)

FOREIGN PATENT DOCUMENTS

AU 2015371732 A1 7/2017
CN 104741334 A 7/2015
(Continued)

*Primary Examiner* — Steven J Ganey
(74) *Attorney, Agent, or Firm* — Lee & Hayes P.C.

(57) ABSTRACT

A nozzle device applied to a high-pressure cleaning machine is provided, including: a nozzle, including a nozzle casing, where a water outlet channel is provided in the nozzle casing, and a front end of the nozzle casing is provided with at least one liquid discharge port connecting with the water outlet channel; and an exhaust valve, connected to the nozzle casing, and including: a valve seat, provided with a valve cavity; and a valve core, movably arranged in the valve cavity; where the valve seat is provided with an air inlet hole and an air outlet hole, the water outlet channel and a main exhaust passage are arranged in parallel in the nozzle casing, and the valve core is movable relative to the valve cavity to a closed position for blocking the main exhaust passage and an open position for opening the main exhaust passage. In the nozzle device applied to a high-pressure cleaning machine and a handheld high-pressure cleaning machine
(Continued)

that are provided in this application, the exhaust valve is provided, and the exhaust valve implements an exhaust function at the open position, and implements a water outlet function at the closed position, thereby implementing self-suction and ensuring that a pressure anomaly is quickly eliminated within a short time during use, to meet a use requirement.

20 Claims, 8 Drawing Sheets

(51) Int. Cl.
*B05B 9/04* (2006.01)
*B08B 3/02* (2006.01)

(52) U.S. Cl.
CPC . *B08B 2203/027* (2013.01); *B08B 2203/0211* (2013.01)

(58) Field of Classification Search
USPC ......................... 239/124, 310, 394, 525, 526
See application file for complete search history.

(56) References Cited

U.S. PATENT DOCUMENTS

| | | | | |
|---|---|---|---|---|
| 9,901,943 | B2 | 2/2018 | Schmalz | |
| 2008/0061167 | A1* | 3/2008 | Gansebom | B05B 1/1672 239/394 |
| 2009/0078293 | A1 | 3/2009 | Hasegawa | |
| 2012/0018534 | A1* | 1/2012 | Gilpatrick | B05B 7/0876 239/310 |
| 2015/0108253 | A1 | 4/2015 | Schmalz | |
| 2017/0282219 | A1 | 5/2017 | Kloepfer et al. | |
| 2018/0133726 | A1 | 5/2018 | Schmalz | |
| 2019/0283061 | A1 | 9/2019 | Qiao | |

FOREIGN PATENT DOCUMENTS

| | | | |
|---|---|---|---|
| CN | 104741334 | B | 10/2016 |
| CN | 205762555 | U | 12/2016 |
| CN | 107073535 | A | 8/2017 |
| CN | 207325432 | U | 5/2018 |
| CN | 108144899 | A | 6/2018 |
| CN | 108212585 | A | 6/2018 |
| CN | 207479075 | U | 6/2018 |
| CN | 207641912 | U | 7/2018 |
| CN | 207787141 | U | 8/2018 |
| CN | 207839213 | U | 9/2018 |
| CN | 208018814 | U | 10/2018 |
| CN | 207479079 | U | 12/2018 |
| CN | 208177712 | U | 12/2018 |
| EP | 1857190 | A1 | 11/2007 |
| EP | 1857190 | A4 | 5/2010 |
| EP | 3237125 | A1 | 11/2017 |
| JP | 2006246928 | A | 9/2006 |
| JP | 2018505338 | A | 2/2018 |
| RU | 2676974 | C1 | 1/2019 |
| WO | 2016102074 | A1 | 6/2016 |
| WO | 2006095466 | A1 | 9/2016 |
| WO | 2018103669 | A1 | 6/2018 |

* cited by examiner

NOZZLE DEVICE APPLIED TO HIGH-PRESSURE CLEANING MACHINE AND HANDHELD HIGH-PRESSURE CLEANING MACHINE

CROSS REFERENCE

This application is the National Stage filing under 35 U.S.C. 371 of International Application No. PCT/CN2019/102427, filed on Aug. 26, 2019, which claims the benefit of earlier filing date and right of priority to Chinese Application No. 201810989402.7, filed Aug. 28, 2018, the contents of which are all hereby incorporated by reference herein in their entirety.

BACKGROUND

Technical Field

The present invention relates to the field of high-pressure cleaning, and in particular, to a nozzle device applied to a high-pressure cleaning machine and a handheld high-pressure cleaning machine.

Related Art

High-pressure cleaning machines are widely used in daily life to clean yards, corridors, outdoor tables and chairs, windows, glass, stairs, and cars. A high-pressure cleaning machine is usually provided with a main unit inside which a motor and a pump driven by the motor are disposed, and further includes a spray gun connected to the water pump. In an initial startup phase of the high-pressure cleaning machine, the pump needs to empty air in a water inlet pipe before the pump can suck water normally. In the initial phase, the pump first empties the air in the water inlet pipe and the pump. The sucked water and the air in the water inlet pipe are mixed and pressurized in the pump. It is difficult to discharge the mixture of air and water. In addition, gas accumulates at a water outlet end to cause an increase in a pressure, it further becomes difficult for the gas in the pump to discharge. Consequently, self-suction takes a long time, or even a normal pressure for normal water spraying may fail to be restored.

SUMMARY

In view of this, it is necessary to provide a nozzle device that is applied to a high-pressure cleaning machine and can quickly eliminate a pressure anomaly within a short time.

It is also necessary to provide a nozzle device applied to a high-pressure cleaning machine, including:

A nozzle device applied to a high-pressure cleaning machine is provided, including:

- a nozzle, including a nozzle casing, where a water outlet channel is provided in the nozzle casing, and a front end of the nozzle casing is provided with at least one liquid discharge port connecting with the water outlet channel, where
- the nozzle device further includes an exhaust valve connected to the nozzle casing, and the exhaust valve includes:
- a valve seat, provided with a valve cavity capable of connecting with the water outlet channel; and
- a valve core, arranged in the valve cavity and movable relative to the valve cavity; where
- the valve seat is provided with an air inlet hole and an air outlet hole, the air inlet hole connects with the water outlet channel and the valve cavity, the air outlet hole connects with the valve cavity, and the air inlet hole, the valve cavity, and the air outlet hole together form a main exhaust passage connecting with external air and the water outlet channel; the nozzle device further includes an exhaust port capable of discharging gas that enters the main exhaust passage to the outside; and the valve core is movable relative to the valve cavity to a closed position for blocking the main exhaust passage and an open position for opening the main exhaust passage.

In an embodiment, the exhaust port and the air outlet hole are integrated, or the exhaust port and the air outlet hole are independent of each other and the exhaust port is provided in the nozzle casing.

In an embodiment, a central axis of the exhaust port is basically parallel or perpendicular to a central axis of the liquid discharge port.

In an embodiment, an opening of the exhaust port and an opening of the liquid discharge port face a same side.

In an embodiment, the nozzle casing includes a body and a cover body with a central axis, the cover body is circumferentially rotatably joined outside the body around the central axis, the cover body is provided with the liquid discharge port, the water outlet channel is provided in the body, and the exhaust valve is arranged in the body.

In an embodiment, the air outlet hole and the exhaust port are independently arranged, there are a plurality of exhaust ports, the plurality of exhaust ports are circumferentially arranged on the cover body around the central axis, there are a plurality of liquid discharge ports, the plurality of liquid discharge ports are circumferentially arranged on the cover body around the central axis, the cover body is operable to rotate circumferentially around the central axis to select one of the plurality of liquid discharge ports to connect with the water outlet channel, and in this case, one of the exhaust ports connects with the air outlet hole.

In an embodiment, the nozzle casing includes a body and a cover body with a central axis, the cover body is circumferentially rotatably joined outside the body around the central axis, the cover body is provided with the liquid discharge port, the water outlet channel is provided in the body, and the exhaust valve is arranged in the cover body.

In an embodiment, there are a plurality of exhaust ports, the plurality of exhaust ports are circumferentially arranged on the cover body around the central axis, a plurality of exhaust valves and liquid discharge ports are arranged in one-to-one correspondence, there are a plurality of liquid discharge ports, the plurality of liquid discharge ports are circumferentially arranged on the cover body around the central axis, the cover body is operable to rotate circumferentially around the central axis to select one of the plurality of liquid discharge ports to connect with the water outlet channel, and in this case, one of the exhaust ports connects with the air outlet hole.

In an embodiment, the nozzle device includes a spray rod, the spray rod is arranged between the nozzle and the high-pressure cleaning machine, and the water outlet channel extends from the spray rod to the nozzle.

In an embodiment, the valve core includes a core body and a reset member, and a gap is provided between the air inlet hole and the core body at the open position.

In an embodiment, the high-pressure cleaning machine is a handheld high-pressure cleaning machine, the handheld high-pressure cleaning machine includes a handheld portion, a motor, and a water pump driven by the motor, the motor and the water pump are both arranged in the handheld portion, and the nozzle device is joined to the handheld portion.

The present invention further provides a handheld high-pressure cleaning machine joined with the nozzle device.

A handheld high-pressure cleaning machine is provided, including a handheld portion, a motor, a water pump driven by the motor, and a nozzle device, where the motor and the water pump are both arranged in the handheld portion, the nozzle device is joined to the handheld portion, and the nozzle device includes:

- a main body, where a water outlet channel is provided in the main body, and a front end of the main body is provided with at least one liquid discharge port connecting with the water outlet channel; and
- an exhaust valve, arranged on a path between a liquid outlet of the water pump and the liquid discharge port of the nozzle, where the exhaust valve includes:
- a valve seat, provided with a valve cavity capable of connecting with the water outlet channel; and
- a valve core, movably arranged in the valve cavity; where
- the valve seat is provided with an air inlet hole and an air outlet hole, the air inlet hole connects with the water outlet channel and the valve cavity, the air outlet hole connects with the valve cavity, and the air inlet hole, the valve cavity, and the air outlet hole together form a main exhaust passage connecting with external air and the water outlet channel; and the valve core is movable relative to the valve cavity to a closed position for blocking the main exhaust passage and an open position for opening the main exhaust passage.

In an embodiment, the main body includes a nozzle and a spray rod connecting the nozzle and the handheld portion, the water outlet channel extends from the spray rod to the nozzle, the exhaust valve is assembled on the spray rod, and the air outlet hole is exposed from the spray rod.

In an embodiment, the main body includes a nozzle, the nozzle includes a nozzle casing, the water outlet channel is provided in the nozzle casing, and a front end of the nozzle casing is provided with at least one liquid discharge port connecting with the water outlet channel; and the exhaust valve is assembled in the nozzle casing.

In an embodiment, the nozzle device further includes an exhaust port capable of discharging gas that enters the main exhaust passage through the air inlet hole to the outside; and the exhaust port and the air outlet hole are integrated, or the exhaust port and the air outlet hole are independent of each other and the exhaust port is provided in the nozzle casing.

In an embodiment, a central axis of the exhaust port is basically parallel to a central axis of the liquid discharge port.

In an embodiment, an opening of the exhaust port and an opening of the liquid discharge port face a same side.

In an embodiment, the air outlet hole and the exhaust port are independently arranged, the nozzle casing includes a body and a cover body with a central axis, the cover body is circumferentially rotatably joined outside the body around the central axis, there are a plurality of exhaust ports, the plurality of exhaust ports are circumferentially arranged on the cover body around the central axis, there are a plurality of liquid discharge ports, the plurality of liquid discharge ports are circumferentially arranged on the cover body around the central axis, the cover body is operable to rotate circumferentially around the central axis to select one of the plurality of liquid discharge ports to connect with the water outlet channel, and in this case, one of the exhaust ports connects with the air outlet hole.

In an embodiment, the nozzle casing includes a body and a cover body with a central axis, the cover body is circumferentially rotatably joined outside the body around the central axis, the cover body is provided with the liquid discharge port, the water outlet channel is provided in the body, and the exhaust valve is arranged in the cover body; and there are a plurality of exhaust ports, the plurality of exhaust ports are circumferentially arranged on the cover body around the central axis, a plurality of exhaust valves and liquid discharge ports are arranged in one-to-one correspondence, there are a plurality of liquid discharge ports, the plurality of liquid discharge ports are circumferentially arranged on the cover body around the central axis, the cover body is operable to rotate circumferentially around the central axis to select one of the plurality of liquid discharge ports to connect with the water outlet channel, and in this case, one of the exhaust ports connects with the air outlet hole.

In an embodiment, the exhaust valve is arranged in the handheld portion and located at the liquid outlet of the water pump.

The present invention further provides a handheld high-pressure cleaning machine joined with the nozzle device.

A nozzle device applied to a high-pressure cleaning machine is provided, including:

- a nozzle, including a nozzle casing, where a water outlet channel is provided in the nozzle casing, and a front end of the nozzle casing is provided with at least one liquid discharge port connecting with the water outlet channel; and
- an exhaust valve, connected to the nozzle casing, where the exhaust valve includes:
- a valve seat, provided with a valve cavity capable of connecting with the water outlet channel; and
- a valve core, movably arranged in the valve cavity; where
- the valve seat is provided with an air inlet hole and an air outlet hole, the air inlet hole connects with the water outlet channel and the valve cavity, the air outlet hole connects with the valve cavity, and the air inlet hole, the valve cavity, and the air outlet hole together form a main exhaust passage connecting with external air and the water outlet channel; and the water outlet channel and the main exhaust passage are arranged in parallel in the nozzle casing, and the valve core is movable relative to the valve cavity to a closed position for blocking the main exhaust passage and an open position for opening the main exhaust passage.

In an embodiment, the nozzle casing is provided with an exhaust port; and

- the air outlet hole and the exhaust port are integrally arranged, and an opening direction of the exhaust port is consistent with an opening direction of the liquid discharge port; or
- the air outlet hole and the exhaust port are independently arranged, and an opening direction of the exhaust port is consistent with an opening direction of the liquid discharge port.
- In an embodiment, a central axis of the exhaust port is parallel or perpendicular to a central axis of the liquid discharge port.

In an embodiment, the exhaust port and the liquid discharge port are located on a same end surface.

In an embodiment, the air outlet hole and the exhaust port are independently arranged, the nozzle casing includes a body and a cover body with a central axis, the cover body is circumferentially rotatably joined outside the body around the central axis, there are a plurality of exhaust ports, the plurality of exhaust ports are circumferentially arranged on the cover body around the central axis, and one of the plurality of exhaust ports connects with the air outlet hole along with rotation of the cover body.

In an embodiment, an auxiliary exhaust passage is formed in the nozzle casing, the auxiliary exhaust passage connects with the main exhaust passage and the exhaust port, and the water outlet channel and the auxiliary exhaust passage are provided on two opposite sides of the central axis; or the auxiliary exhaust passage connects with the water outlet channel and the main exhaust passage.

In an embodiment, there are a plurality of liquid discharge ports, and the plurality of liquid discharge ports are circumferentially arranged on the cover body around the central axis; and one of the plurality of liquid discharge ports connects with the water outlet channel along with rotation of the cover body.

In an embodiment, the valve cavity includes a first cavity and a second cavity selectively connecting with the first cavity, the valve core includes a core body and a reset member, the first cavity is in fluid connection with the water outlet channel, the second cavity is in fluid connection with the first cavity, the air outlet hole penetrates a cavity wall of the second cavity, the core body is slidably accommodated in the first cavity in a direction toward or away from the second cavity, and the reset member is accommodated in the second cavity and deformably abuts between the core body and the valve seat in a sliding direction of the valve core.

In an embodiment, the valve cavity includes a first cavity and a second cavity selectively connecting with the first cavity, the valve core includes a core body, a valve stem connected to the core body, and a reset member, the core body is slidably accommodated in the first cavity in a direction toward or away from the second cavity, the valve stem movably passes through the second cavity in an axial direction of the valve stem and protrudes from the main body, and the reset member abuts between the valve seat and the valve stem.

In an embodiment, a gap is provided between an outer contour of the air inlet hole and an outer contour of a cross section where the core body at the open position contacts the air inlet hole.

In an embodiment, the high-pressure cleaning machine is a handheld high-pressure cleaning machine, the handheld high-pressure cleaning machine includes a handheld portion, a motor, and a water pump driven by the motor, the motor and the water pump are both arranged in the handheld portion, and the nozzle device is joined to the handheld portion.

A handheld high-pressure cleaning machine is provided, including a handheld portion, a motor, a water pump driven by the motor, and a nozzle device, where the motor and the water pump are both arranged in the handheld portion, the nozzle device is joined to the handheld portion, and the nozzle device includes:

a main body, where a water outlet channel is provided in the main body, and a front end of the main body is provided with at least one liquid discharge port connecting with the water outlet channel; and an exhaust valve, arranged on a path between a liquid outlet of the water pump and the liquid discharge port, where the exhaust valve is arranged in parallel with the water outlet channel and includes:

a valve seat, provided with a valve cavity capable of connecting with the water outlet channel; and a valve core, movably arranged in the valve cavity; where the valve seat is provided with an air inlet hole and an air outlet hole, the air inlet hole connects with the water outlet channel and the valve cavity, the air outlet hole connects with the valve cavity, and the air inlet hole, the valve cavity, and the air outlet hole together form a main exhaust passage connecting with external air and the water outlet channel; and the water outlet channel and the main exhaust passage are arranged in parallel in the main body, and the valve core is movable relative to the valve cavity to a closed position for blocking the main exhaust passage and an open position for opening the main exhaust passage.

In an embodiment, the main body includes a nozzle and a spray rod detachably joined to an end of the nozzle, the water outlet channel extends from the spray rod to the nozzle, the exhaust valve is assembled on the spray rod, and the air outlet hole is exposed from the spray rod.

In an embodiment, the main body includes a nozzle, the water outlet channel is formed in the nozzle, and the exhaust valve is assembled in the nozzle.

In an embodiment, the liquid discharge port is provided in the nozzle, and the nozzle is provided with an exhaust port; and the air outlet hole and the exhaust port are integrally arranged, and an opening direction of the exhaust port is consistent with an opening direction of the liquid discharge port; or the air outlet hole and the exhaust port are independently arranged, and an opening direction of the exhaust port is consistent with an opening direction of the liquid discharge port.

In an embodiment, a central axis of the exhaust port is parallel or perpendicular to a central axis of the liquid discharge port.

In an embodiment, the exhaust port and the liquid discharge port are located on a same end surface.

In an embodiment, the air outlet hole and the exhaust port are independently arranged, the nozzle casing includes a body and a cover body with a central axis, the cover body is circumferentially rotatably joined outside the body around the central axis, there are a plurality of exhaust ports, the plurality of exhaust ports are circumferentially arranged on the cover body around the central axis, and one of the plurality of exhaust ports connects with the air outlet hole along with rotation of the cover body.

In an embodiment, an auxiliary exhaust passage connecting with the main exhaust passage and the exhaust port is formed in the nozzle casing, and the water outlet channel and the auxiliary exhaust passage are provided on two opposite sides of the central axis.

In an embodiment, there are a plurality of liquid discharge ports, and the plurality of liquid discharge ports are circumferentially arranged on the cover body around the central axis; and one of the plurality of liquid discharge ports connects with the water outlet channel along with rotation of the cover body.

In the handheld high-pressure cleaning machine provided in this application, the exhaust valve is provided, and the exhaust valve implements an exhaust function at the open position, to meet a requirement of vacuum in the pump; and the exhaust valve implements a water outlet function at the closed position, thereby implementing self-suction and ensuring that a pressure anomaly is quickly eliminated within a short time during use, to meet a use requirement.

DETAILED DESCRIPTION

For ease of understanding the present invention, the present invention is described more comprehensively below with reference to the accompanying drawings. The accompanying drawings show exemplary embodiments of the present invention. However, the present invention may be implemented in many different forms, and is not limited to the embodiments described in this specification. On the contrary, the embodiments are provided to make understanding of the disclosed content of the present invention more comprehensive.

It should be noted that, when a component is referred to as "being fixed to" another component, the component may be directly on the another component, or there may be an intermediate component. When a component is considered to be "connected to" another component, the component may be directly connected to the another component, or there may be an intermediate component.

Unless otherwise defined, meanings of all technical and scientific terms used in this specification are the same as that usually understood by a person skilled in the technical field to which the present invention belongs. In this specification, terms used in the specification of the present invention are merely intended to describe objectives of the specific embodiments, but are not intended to limit the present invention. The term "and/or" used in this specification includes any and all combinations of one or more related listed items.

Figure 1:
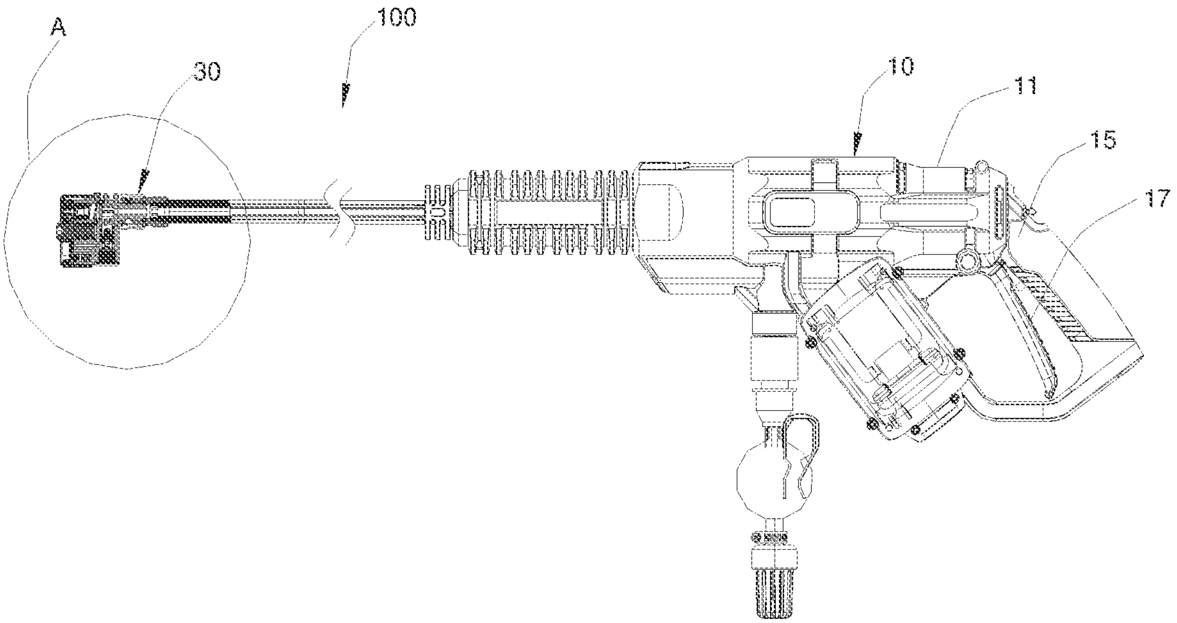
FIG. 1 is a schematic structural diagram of a handheld high-pressure cleaning machine according to the present invention.

Referring to FIG. 1, in an exemplary embodiment of the present invention, a nozzle device 30 is applied to a high-pressure cleaning machine, to spray pumped water during the use of the high-pressure cleaning machine, to implement a cleaning function. In this specific embodiment, the high-pressure cleaning machine is a handheld high-pressure cleaning machine. It may be understood that, in some other embodiments, the nozzle device 30 may also be applied to a high-pressure cleaning device of another type, for example, a vertical high-pressure cleaning machine, a spray gun, and the like.

Descriptions are provided below by using an example in which the nozzle device 30 is applied to a handheld high-pressure cleaning machine 100. The example is merely used for exemplary purposes, and does not constitute a limitation on the technical scope of this application.

The handheld high-pressure cleaning machine 100 includes a handheld portion 10 and the nozzle device 30 joined to the handheld portion 10. The handheld portion 10 includes a casing 11 that is roughly pistol-shaped, functional components (not shown in the figure) arranged in the casing 11, a handle 15 for holding, and a startup switch 17. The casing 11 has a structure with a left half and a right half. That is, a first half casing and a second half casing are connected to form the casing. The functional components include components that are used to pump an external water source, and are, for example, a motor 13, a water pump driven by the motor, and a water inlet valve. The startup switch 17 is arranged near the handle 15, and is specifically a trigger. A user pulls the trigger to trigger connection between the external water source and the water pump. The motor rotates, and external water enters the water pump under a suction force and is sprayed through the nozzle device 30, to implement a cleaning function.

In this specific embodiment, for a requirement of portability, the handheld high-pressure cleaning machine 100 does not have a water tank for storing a water source. Instead, the handheld high-pressure cleaning machine is connected to a water inlet pipe by a water inlet of the handheld portion 10, and the water inlet pipe is then connected to an external water source. The external water source may be a pond, a faucet or the like. In addition, the handheld portion further includes a battery pack mounting portion for connecting a battery pack. The handheld high-pressure cleaning machine 100 is powered by a battery pack with a DC power supply, to prevent the use distance and environment of the handheld high-pressure cleaning machine 100 from being restricted by a power cable. It may be understood that, in some other embodiments, the handheld high-pressure cleaning machine 100 may have a water storage device for storing a water source. In addition, the handheld high-pressure cleaning machine may alternatively be powered and driven by using a battery pack and an external power supply or only by using an external power supply. This is not limited herein.

Figure 2:
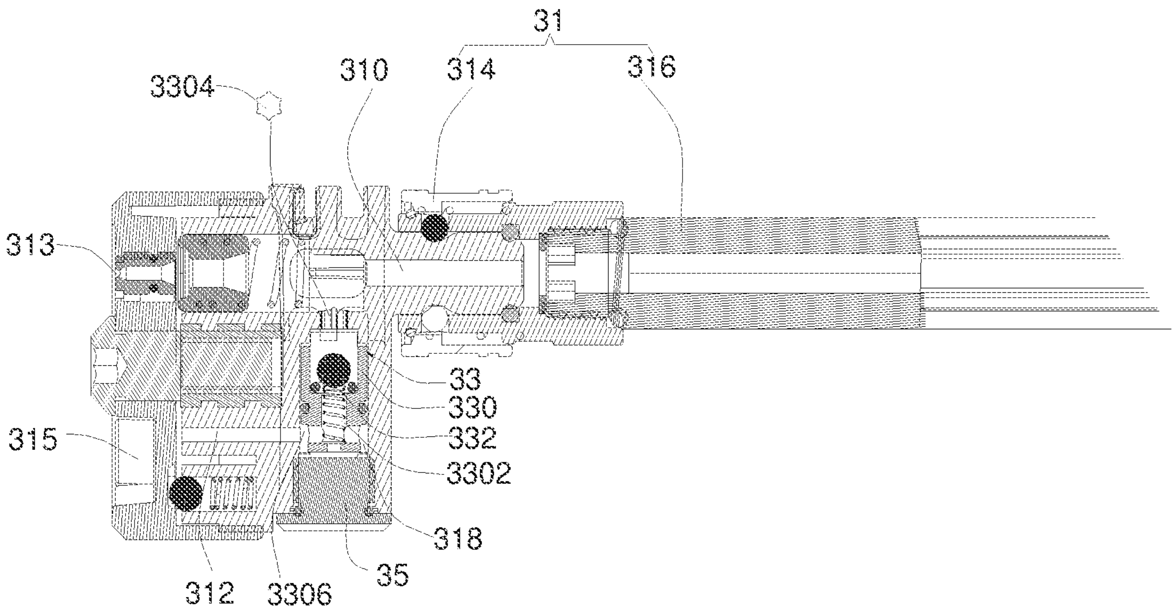
FIG. 2 is an enlarged view of a part A of the handheld high-pressure cleaning machine shown in FIG. 1.

Referring to FIG. 2, the nozzle device 30 includes a main body 31 and an exhaust valve 33. The main body 31 is joined to the handheld portion 10, and is used for spraying high-pressure water. The exhaust valve 33 provides a passage for internal air that is discharged when the handheld high-pressure cleaning machine 100 is started.

Specifically, a water outlet channel 310 is provided in the main body 31, and a front end of the main body 31 is provided with at least one liquid discharge port 313 connecting with the water outlet channel 310. A pumped high-pressure water stream passes through the water outlet channel 310 and is sprayed from the liquid discharge port 313 connecting with the water outlet channel 310.

The handheld high-pressure cleaning machine sucks water from an external water source into the water pump through the water inlet pipe connected to the water inlet, and discharges the water after the water is pressurized by the water pump. Therefore, in an initial working stage of the handheld high-pressure cleaning machine, the water pump needs to empty air in the water inlet pipe before the water pump can suck water from the external water source into the water pump. When water from the external water source starts to be sucked into the water pump but the nozzle still does not spray water normally, the initially sucked water and air are mixed and compressed and are discharged to the water outlet channel. If the water outlet channel has no exhaust structure, on one hand, air accumulates in the water outlet channel to form a high-pressure region, it is difficult to empty the air in the water pump, and consequently, the handheld high-pressure cleaning machine cannot discharge a water stream that meets a pressure requirement. On the other hand, the water and air in the water pump are mixed and compressed to form cavitation bubbles. The cavitation bubbles burst to produce noise and vibration, resulting in relatively great noise and vibration of the handheld high-pressure cleaning machine. According to some embodiments of the present invention, the exhaust valve 33 is arranged between a liquid outlet of the water pump and the liquid discharge port 313 of the nozzle, to discharge in time gas mixed in the water outlet channel, to reduce the air pressure in the water outlet channel, so that air in the water pump can be successfully emptied, and the handheld high-pressure cleaning machine can work normally to discharge a water stream that meets the pressure requirement and has low noise and vibration.

The exhaust valve 33 is connected to the main body 31, and includes a valve seat 330 and a valve core 332. The valve seat 330 is provided with a valve cavity 3302 capable of connecting with the water outlet channel 310. The valve core 332 is arranged in the valve cavity 3302 and movable relative to the valve cavity 3302.

The nozzle device 30 is further provided with an exhaust port 315 connecting with external air. The exhaust port 315 can connect with the water outlet channel 310. The valve cavity 3302 is located on a connecting path between the exhaust port 315 and the water outlet channel. The valve core 332 is movable relative to the valve cavity 3302 to an open position for connecting the exhaust port 315 and the water outlet channel 310 and a closed position for blocking the exhaust port 315 and the water outlet channel 310.

Specifically, the valve seat 330 is provided with an air inlet hole 3304 and an air outlet hole 3306, the air inlet hole 3304 connects with the water outlet channel 310 and the valve cavity 3302, the air outlet hole 3306 connects with the valve cavity 3302, and the air inlet hole 3304, the valve cavity 3302, and the air outlet hole 3306 together form a main exhaust passage connecting with external air and the water outlet channel 310. The water outlet channel 310 and the main exhaust passage are arranged in parallel in the main body 31. When the valve core 332 moves relative to the valve cavity 3302 to the closed position, the valve core 332 blocks the main exhaust passage, and the exhaust port 315 does not connect with the water outlet channel 310. When the valve core 332 moves relative to the valve cavity 3302 to the open position, the valve core 332 opens the main exhaust passage, and the exhaust port 315 connects with the water outlet channel 310.

When the water outlet channel 310 and the main exhaust passage are arranged in parallel, the water outlet channel 310 used for discharging liquid and the main exhaust passage used for exhausting gas are provided as two branches. That is, the functions of the water outlet channel and the main exhaust passage are independent of each other and do not affect each other.

When the handheld high-pressure cleaning machine 100 is started and water still does not spray from the nozzle, water and gas mainly mix in the water outlet channel, and there is a particular pressure, so that the valve core 332 is located at the open position relative to the valve cavity 3302. After entering and passing through the main exhaust passage via the air inlet hole 3304, internal air passes through the air outlet hole 3306 and is finally discharged from the exhaust port 315. When the handheld high-pressure cleaning machine 100 enters a working state after the startup, the water outlet channel is filled with a high-pressure water stream, and the water stream with a sufficient pressure presses the valve core 332 to compress a reset member, so that the valve core 332 moves relative to the valve cavity 3302 to the closed position, the main exhaust passage is blocked, and the high-pressure water is directly sprayed through the water outlet channel 310 under a vacuum environment.

Figure 3:
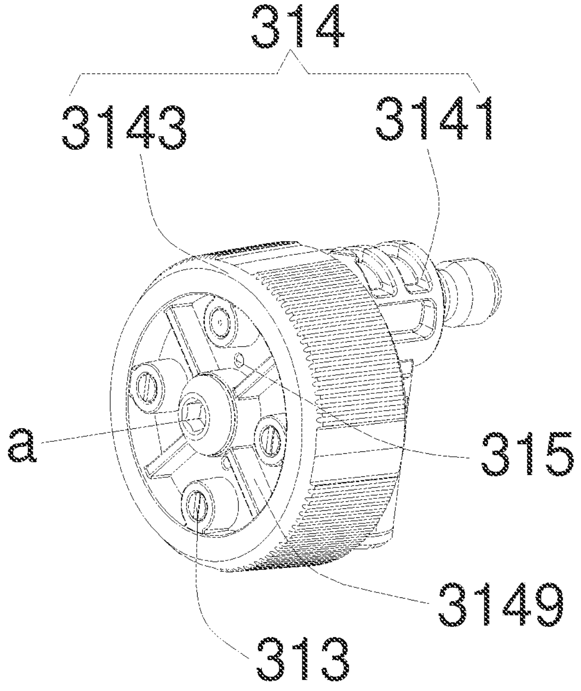
FIG. 3 is a schematic diagram of a first structure of a main body in the handheld high-pressure cleaning machine shown in FIG. 1.

Referring to FIG. 3, in a first structure, the main body 31 only includes a nozzle, and the main body 31 is directly detachably joined to the handheld portion 10 by the nozzle.

Specifically, the nozzle includes a nozzle casing 314, and the water outlet channel 310 is provided in the nozzle casing 314. The nozzle casing 314 includes a body 3141 and a cover body 3143 with a central axis a, and the cover body 3143 is circumferentially rotatably joined outside the body 3141 around the central axis a.

There are a plurality of liquid discharge ports 313. The plurality of liquid discharge ports 313 are circumferentially arranged on the cover body 3143 around the central axis a, and one of the plurality of liquid discharge ports 313 connects with the water outlet channel 310 along with rotation of the cover body 3143. The plurality of liquid discharge ports 313 all have different shapes, so that during use, a user may select one required liquid discharge port 313 according to a requirement of a different working condition, to spray a water stream of a matching shape. For example, the shape of the liquid discharge port 313 may be one or a combination of two or more of a circle, an ellipse, and a square. It may be understood that, in some other embodiments, the shape of a spout of the liquid discharge port 313 may be determined as required, which is not limited herein.

Further, the cover body 3143 includes a plurality of reinforcing ribs 3149, and each reinforcing rib 3149 is arranged between two adjacent liquid discharge ports 313. One end of each reinforcing rib 3149 is connected to a central position of the cover body 3143, and the other end extends to the edge of the cover body 3143, to separate two adjacent liquid discharge ports 313 and reinforce the strength of the cover body 3143.

Figure 4:
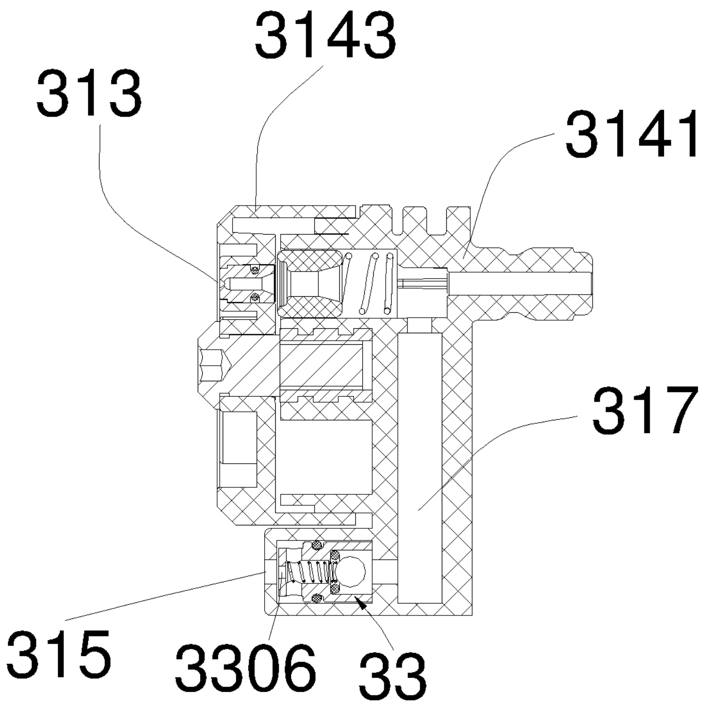
FIG. 4 is a schematic structural diagram of an embodiment of the main body in the handheld high-pressure cleaning machine shown in FIG. 3.
Figure 5:
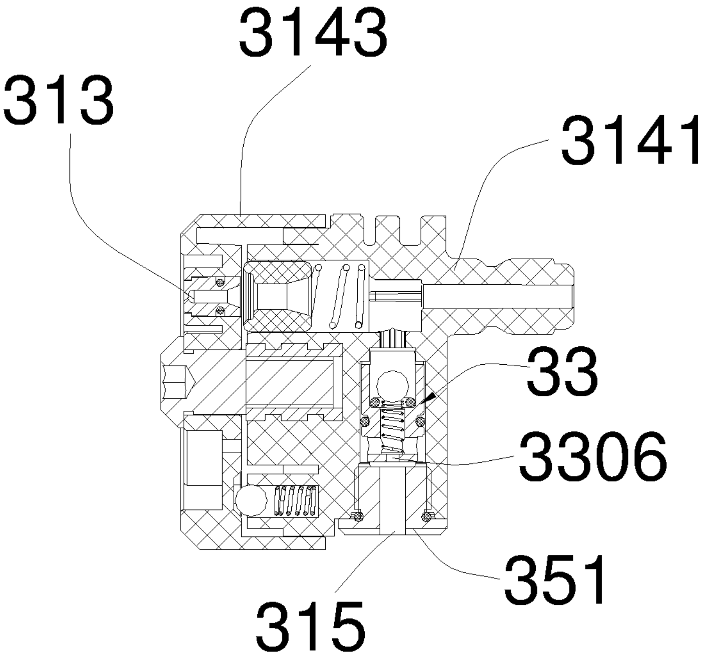
FIG. 5 is a schematic structural diagram of another embodiment of the main body in the handheld high-pressure cleaning machine shown in FIG. 3.

Referring to FIG. 4, FIG. 5, FIG. 6, and FIG. 7, the exhaust valve 33 is arranged in the nozzle casing 314, so that the exhaust port 315 is relatively close to the liquid discharge port 313. The gas mixed with liquid discharged from the exhaust port 315 can be relatively close to a cleaning liquid stream discharged from the liquid discharge port 313, and the gas mixed with liquid discharged from the exhaust port 315 is mixed with the cleaning liquid stream. If the exhaust port 315 is relatively far away from the nozzle, a user may misjudge that the high-pressure cleaning machine is leaking. In addition, the high-pressure cleaning machine inevitably wets unexpected places during use, which affects user experience. The exhaust valve 33 and the nozzle casing 314 may be arranged in the following manners:

Referring to FIG. 4 and FIG. 5, the body 3141 of the nozzle casing 314 is provided with the exhaust port 315 matching the exhaust valve 33. The exhaust port 315 can discharge gas that enters the main exhaust passage through the air inlet hole 3304 to the outside. The exhaust valve 33 is arranged on the body 3141 of the nozzle casing 314, and the air outlet hole 3306 in the exhaust valve 33 and the exhaust port 315 are integrated. That is, the air outlet hole 3306 in the exhaust valve 33 is the air outlet hole 3306 of the main exhaust passage and is also the exhaust port 315 in the nozzle casing 314. The air outlet hole and the exhaust port are integrated. In other words, in this structure, an air outlet end of the exhaust valve 33 is exposed from the body 3141. That is, the air outlet hole 3306 of the exhaust valve 33 directly discharges gas passing through the main exhaust passage to the outside.

Referring to FIG. 4, in an embodiment, the exhaust valve 33 is transversely arranged in the body 3141 in the horizontal direction, or the exhaust valve 33 is transversely arranged in the horizontal direction and connected to the outside of the body 3141. In this case, an opening direction of the exhaust port 315 is consistent with an opening direction of the liquid discharge port 313. The consistent opening directions indicate that an opening of the exhaust port 315 and an opening of the liquid discharge port 313 face a same side, or a central axis of the exhaust port is basically parallel to a central axis of the liquid discharge port. That is, an angle between the two central axes is not greater than 20°. In an embodiment, the opening direction of the exhaust port 315 is basically perpendicular to the opening direction of the liquid discharge port 313, as shown in FIG. 5.

Further, the exhaust port 315 and the liquid discharge port 313 are located on a same end surface. That is, one end of the exhaust valve 33 provided with the exhaust port 315 is basically flush with a surface of the cover body 3143 provided with the liquid discharge port 313.

Referring to FIG. 5, in another embodiment, the exhaust valve 33 is arranged in the body 3141 in the vertical direction, or the exhaust valve 33 is connected to the outside of the body 3141 in the vertical direction. The exhaust valve 33 further includes a press cap 351, and the body 3141 is provided with an accommodating cavity below the exhaust valve 33. The press cap 351 detachably seals the accommodating cavity and is supported at a lower end of the exhaust valve 33 to protect the exhaust valve 33. In addition, during subsequent maintenance, the exhaust valve 33 can be replaced or maintained independently by only removing the press cap 351 instead of replacing the nozzle device 30 as a whole. In addition, the air outlet hole 3306 penetrates from the exhaust valve 33 to the press cap 351, so that the air outlet hole 3306 and the exhaust port 315 are integrally arranged. In this case, the opening direction of the exhaust port 315 is basically perpendicular to the opening direction of the liquid discharge port 313.

Figure 7:
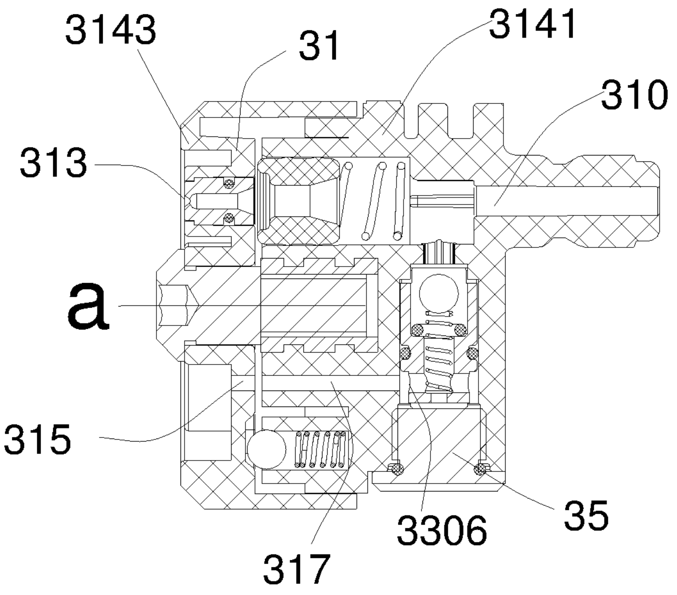
FIG. 7 is a schematic structural diagram of yet another embodiment of the main body in the handheld high-pressure cleaning machine shown in FIG. 6.

Referring to FIG. 2 and FIG. 7, in this embodiment, the exhaust valve 33 is arranged in the body 3141 in the vertical direction, and the exhaust valve 33 further includes a press cap 35. In this embodiment, a connection structure of the press cap is basically the same as that of the press cap 351 in the embodiment shown in FIG. 5. The difference lies in that the air outlet hole 3306 does not penetrate the press cap 35, but connects with the outside through the body 3141.

In another embodiment, the exhaust valve 33 is arranged in the cover body, and a quantity of exhaust valves is in one-to-one correspondence with a quantity of exhaust ports. Specifically, the cover body 3143 is provided with a plurality of exhaust ports 315 matching the exhaust valve 33, and the plurality of exhaust valves 33 and the plurality of exhaust ports 315 are arranged in one-to-one correspondence. The plurality of exhaust ports 315 are circumferentially arranged on the cover body around the central axis. There are a plurality of liquid discharge ports 313. The plurality of liquid discharge ports 313 are circumferentially arranged on the cover body 3143 around the central axis. The cover body 3143 is operable to rotate circumferentially around the central axis to select one of the plurality of liquid discharge ports 313 to connect with the water outlet channel 310. In this case, one of the exhaust ports 315 connects with the air outlet hole 3306, that is, connects with the exhaust channel 312.

Figure 6:
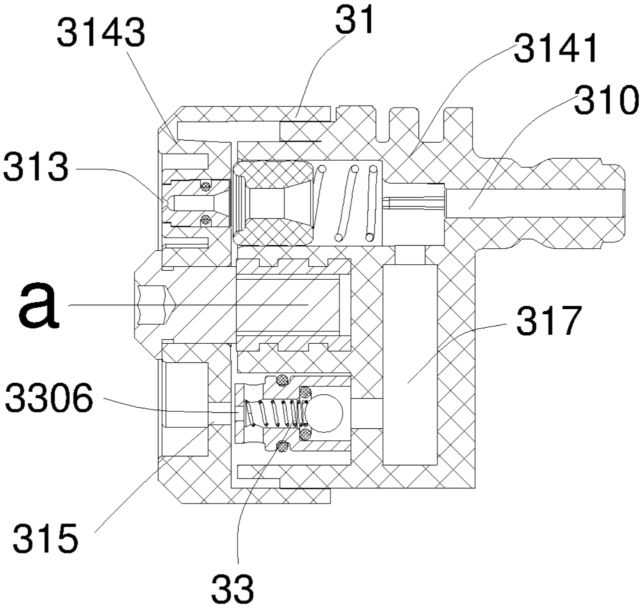
FIG. 6 is a schematic structural diagram of still another embodiment of the main body in the handheld high-pressure cleaning machine shown in FIG. 1.

Referring to FIG. 6 and FIG. 7, the cover body 3143 of the nozzle casing 314 is provided with a plurality of exhaust ports 315 matching the exhaust valve 33, and the exhaust valve 33 is arranged in the body 3141. In this case, the air outlet hole 3306 and the exhaust port 315 are independently arranged, and an opening direction of the exhaust port 315 is consistent with an opening direction of the liquid discharge port 313. The consistent opening directions indicate that an opening of the exhaust port 315 and an opening of the liquid discharge port 313 face a same side, or a central axis of the exhaust port is basically parallel to a central axis of the liquid discharge port. That is, an angle between the two central axes is not greater than 20°.

Specifically, there are a plurality of exhaust ports 315. The plurality of exhaust ports 315 are circumferentially arranged on the cover body 3143 around the central axis a, and one of the plurality of exhaust ports 315 connects with the exhaust channel 312 along with rotation of the cover body 3143.

In this embodiment, there are a plurality of liquid discharge ports 313. The plurality of liquid discharge ports 313 are circumferentially arranged on the cover body 3143 around the central axis. The cover body 3143 is operable to rotate circumferentially around the central axis to select one of the plurality of liquid discharge ports 313 to connect with the water outlet channel 310. In this case, one of the exhaust ports 315 connects with the air outlet hole 3306, that is, connects with the exhaust channel 312.

In this specific embodiment, the liquid discharge ports 313 and the exhaust ports 315 have a one-to-one correspondence with respect to the central axis a. That is, when the cover body 3143 is rotated, while one liquid discharge port 313 of the plurality of liquid discharge ports 313 connects with the water outlet channel 310, one exhaust port 315 of the plurality of exhaust ports 315 connects with the main exhaust passage, so that each time the cover body rotates, the corresponding liquid discharge port 313 and exhaust port 315 cooperate with each other to implement functions of spraying by the nozzle device 30 and exhausting by the exhaust valve 33. Specifically, four liquid discharge ports 313 are evenly arranged circumferentially with the central axis a as the center, and four exhaust ports 315 are also evenly arranged circumferentially with the central axis a as the center. Connection lines between the four liquid discharge ports 313 and connection lines between the four exhaust ports 315 respectively form an outer circle and an inner circle centered on the central axis a. That is, a central angle between two adjacent liquid discharge ports 313 is 90°.

Still referring to FIG. 6, in still another embodiment, the exhaust valve 33 is arranged at a front end, close to the cover body 3143, of the body 3141, and the air outlet hole 3306 is provided on a surface, facing the cover body 3143, of the body 3141. An auxiliary exhaust passage 317 connecting with the main exhaust passage and the water outlet channel 310 is formed in the body 3141 of the nozzle casing 314. In this case, an axis on which the auxiliary exhaust passage 317 is located is perpendicular to an axis on which the exhaust port 315 is located, and an axis on which the main exhaust passage in the exhaust valve 33 is located is basically parallel to the axis on which the exhaust port 315 is located (as shown in FIG. 6, specifically, the exhaust valve 33 is horizontally arranged in the body 3141).

Referring to FIG. 7, in yet another embodiment, the exhaust valve 33 is arranged at a rear end, away from the cover body 3143, of the body 3141, and the auxiliary exhaust passage 317 connecting with the main exhaust passage and the exhaust port 315 is formed in the body 3141 of the nozzle casing 314. That is, the auxiliary exhaust passage 317 penetrates the air outlet hole 3306 in the exhaust valve 33 and the surface, facing the cover body 3143, of the body 3141. In this case, the water outlet channel 310 and the auxiliary exhaust passage 317 are arranged on two opposite sides of the central axis, the axis on which the auxiliary exhaust passage 317 is located is parallel to the axis on which the exhaust port 315 is located, and the axis on which the exhaust valve 33 is located is perpendicular to the axis on which the exhaust port 315 is located (as shown in FIG. 7, the exhaust valve 33 is vertically arranged in the body 3141).

Further, the auxiliary exhaust passage 317 includes an air inlet end connecting with the exhaust valve 33 and an air outlet end corresponding to the air inlet end and connecting with the outside. A hole diameter of the air outlet end is greater than a hole diameter of the air inlet end, to provide buffer for airflow discharge, so as to avoid an increase in an air pressure in the exhaust valve 33 due to slow airflow discharge. It may be understood that, in some other embodiments, positions of the exhaust channel 312, the exhaust valve 33, and the exhaust port 315 and angles between axes thereof may be determined as required, provided that air in the handheld high-pressure cleaning machine 100 is discharged by mutual cooperation to form a vacuum environment. This is not limited herein.

Referring to FIG. 2 again, in a second structure, the main body 31 includes a nozzle and a spray rod 316 arranged between the nozzle and the high-pressure cleaning machine Specifically, the spray rod 316 is detachably joined to an end of the nozzle, and the main body 31 is detachably joined to the handheld portion 10 by the spray rod 316. That is, the spray rod 316 connects the nozzle and the handheld portion 10. The water outlet channel 310 extends from the spray rod to the nozzle. The exhaust valve 33 is arranged in the main body 31 and is located on a path between a liquid outlet of the water pump and the liquid discharge port 313, to discharge internal air when the handheld high-pressure cleaning machine 100 is started, so as to form a vacuum in the water pump and generate a pressure difference, so that water is sucked into the pump from the water inlet pipe to generate a high-pressure water stream, thereby implementing an automatic water-suction function. When the exhaust valve 33 is arranged on the path between the liquid outlet of the water pump and the liquid discharge port 313, it should be understood that the exhaust valve connects with the liquid outlet of the water pump and the liquid discharge port 313.

Specifically, the exhaust valve 33 is assembled on the spray rod and the air outlet hole 3306 is exposed from the spray rod 316. The main exhaust passage and the water outlet channel 310 are arranged in parallel, to implement a water discharge function through the water outlet channel 310 and implement an exhaust function through the main exhaust passage, thereby finally implementing high-pressure spraying and low-pressure self-suction functions of the handheld high-pressure cleaning machine 100. In this embodiment, the nozzle is detachably assembled on the handheld portion 10 through the spray rod, and is mainly applied to working conditions with a long shooting range and a wide spraying range.

In yet another embodiment, the exhaust valve 33 is arranged in the handheld portion 10 and located at the liquid outlet of the water pump, to directly discharge air in the water pump to form a vacuum in the water pump.

Figure 8:
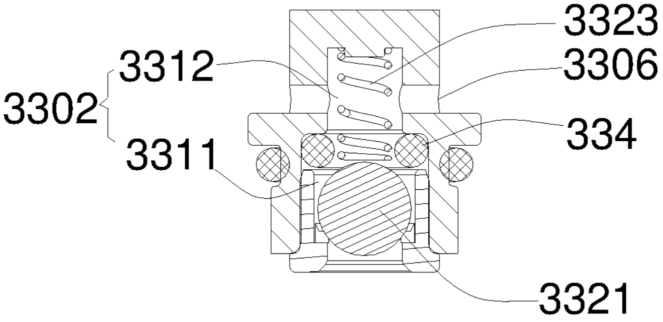
FIG. 8 is a schematic structural diagram of an exhaust valve in the handheld high-pressure cleaning machine shown in FIG. 1 in a first embodiment.

Referring to FIG. 8, in the foregoing embodiment, the valve cavity 3302 includes a first cavity 3311 and a second cavity 3312. The first cavity 3311 is in fluid connection with the water outlet channel 310, and the second cavity 3312 is in fluid connection with the first cavity 3311. The air outlet hole 3306 penetrates a cavity wall of the second cavity 3312. At the closed position, the valve core 332 sealingly blocks a position at which the first cavity 3311 connects with the second cavity 3312.

The valve core 332 includes a core body 3321 and a reset member 3323. The core body 3321 is slidably accommodated in the first cavity 3311 in a direction toward or away from the second cavity 3312. The reset member 3323 is accommodated in the second cavity 3312 and deformably abuts between the core body 3321 and the valve seat 330 in a sliding direction of the valve core 332.

Referring to FIG. 8, in a first embodiment, the first cavity 3311 and the second cavity 3312 are both round holes with constant inner diameters in the axial direction. The inner diameter of the first cavity 3311 is greater than the inner diameter of the second cavity 3312, so that a step is formed between the first cavity 3311 and the second cavity 3312. The exhaust valve 33 includes a seal ring 334. The seal ring 334 is a circular ring supported on the step. The core body 3321 is a steel ball matching the seal ring 334 in shape. It may be understood that, in some other embodiments, the shape of the seal ring 334 and the shape of the core body 3321 may be determined as required, provided that the seal ring and the core body can seal the end at which the first cavity 3311 connects with the second cavity 3312 when the valve core 332 is at the closed position relative to the valve seat 330. This is not limited herein.

When the handheld high-pressure cleaning machine 100 is started, the reset member 3323 is in a normal state. The core body 3321 is supported on the reset member 3323 and protrudes from the seal ring 334 to form a particular gap with the seal ring 334. After entering the first cavity 3311 through the air inlet hole 3304, internal air enters the second cavity 3312 through the gap, and is discharged from the air outlet hole 3306, to implement the exhaust function.

When the handheld high-pressure cleaning machine 100 is working, while high-pressure water enters the pump and flows through the water outlet channel 310, the high-pressure water acts on the core body 3321 after entering the first cavity 3311 through the air inlet hole 3304, and the reset member 3323 is compressed. The core body 3321 moves toward the seal ring 334 and is stopped outside the seal ring 334 under the continuous pressure of high-pressure water, to seal, together with the seal ring 334, the gap between the first cavity 3311 and the second cavity 3312, to prevent water from entering.

It may be understood that, in other embodiments, the first cavity 3311 and the second cavity 3312 may both be round holes with constant inner diameters in the axial direction. That is, the first cavity 3311 connects with the second cavity 3312 to form a straight through hole with a constant inner diameter in the axial direction. The seal ring 334 is arranged at one end, connecting with the second cavity 3312, of the first cavity 3311. An inner diameter of a part, provided with no seal ring 334, of the first cavity 3311 is greater than an outer diameter of the core body 3321, and an inner diameter of the seal ring 334 is less than the outer diameter of the core body 3321.

Figure 9:
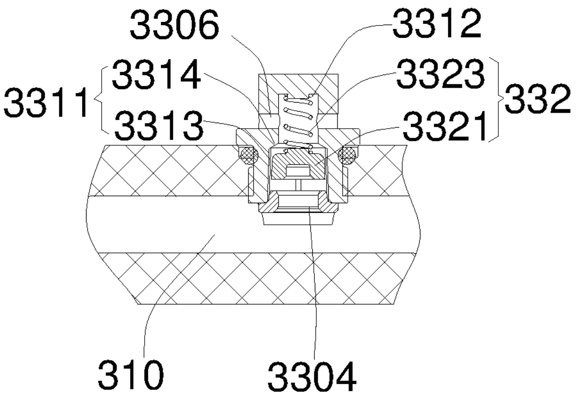
FIG. 9 is a schematic structural diagram of the exhaust valve in the handheld high-pressure cleaning machine shown in FIG. 1 in an open state in a second embodiment.
Figure 10:
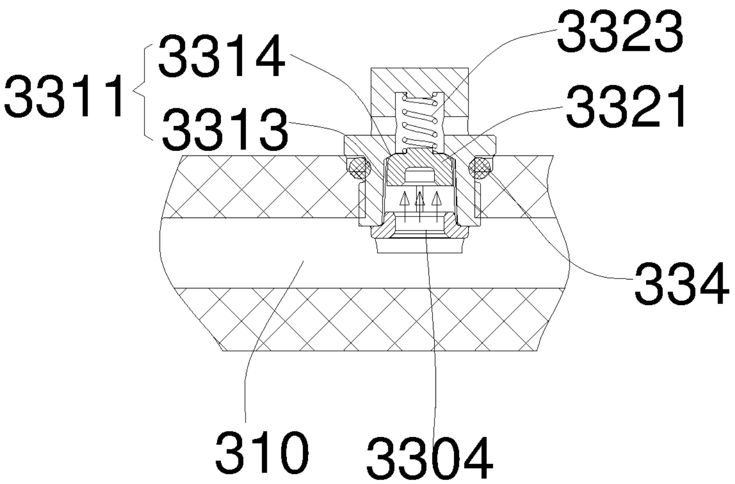
FIG. 10 is a schematic structural diagram of the exhaust valve in the handheld high-pressure cleaning machine shown in FIG. 9 in a closed state in the second embodiment.

Referring to FIG. 9 and FIG. 10, in a second embodiment, compared with the first embodiment, the first cavity 3311 is a conical hole whose inner diameter changes in the axial direction, and includes a wide opening 3313 and a narrow opening 3314 connected between the wide opening 3313 and the second cavity 3312. A minimum inner diameter of the wide opening 3313 is greater than a maximum outer diameter of the core body 3321, and a maximum inner diameter of the narrow opening 3314 is less than the maximum outer diameter of the core body 3321.

Referring to FIG. 9, when the handheld high-pressure cleaning machine 100 is started, the reset member 3323 is in a free state. The core body 3321 is supported on the reset member 3323 and protrudes from the narrow opening 3314 to form a particular gap with the narrow opening 3314. After entering the first cavity 3311 through the air inlet hole 3304, internal air enters the second cavity 3312 through the gap between the wide opening 3313 and the core body 3321, and is discharged from the air outlet hole 3306 to the exhaust channel 312, to implement the exhaust function.

Referring to FIG. 10, when the handheld high-pressure cleaning machine 100 is working, while high-pressure water enters the pump and flows through the water outlet channel 310, the high-pressure water acts on the core body 3321 after entering the first cavity 3311 through the air inlet hole 3304, and the reset member 3323 is compressed. The core body 3321 moves toward the narrow opening 3314 and is stopped at the narrow opening 3314 under the continuous pressure of high-pressure water, to seal, together with the narrow opening 3314, the gap between the first cavity 3311 and the second cavity 3312, to prevent water from entering.

In this specific embodiment, the core body 3321 is a sealing plug with an inverted U-shaped cross-section. A closed end of the core body 3321 is connected to the reset member 3323, and an open end of the core body 3321 connects with the air inlet hole 3304, so that when a high-pressure water stream flows into the water outlet channel 310, the water stream flows into the first cavity 3311 through the air inlet hole 3304 and applies, through the open end of the core body 3321, a pressure to the entire core body 3321 to compress the reset member 3323.

Figure 11:
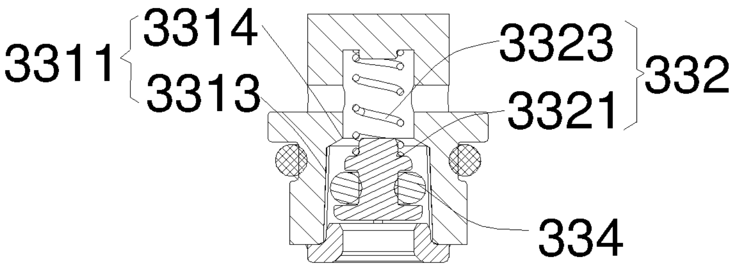
FIG. 11 is a schematic structural diagram of the exhaust valve in the handheld high-pressure cleaning machine shown in FIG. 1 in a closed state in a third embodiment.

Referring to FIG. 11, in a third embodiment, compared with the first embodiment, the core body 3321 is a structure with an I-shaped cross-section. The exhaust valve 33 includes the seal ring 334, and the seal ring 334 is nested in an opening of the I-shaped core body 3321. When the core body 3321 is at the closed position, the seal ring 334 blocks the narrow opening 3314 in a sealing manner.

Figure 12:
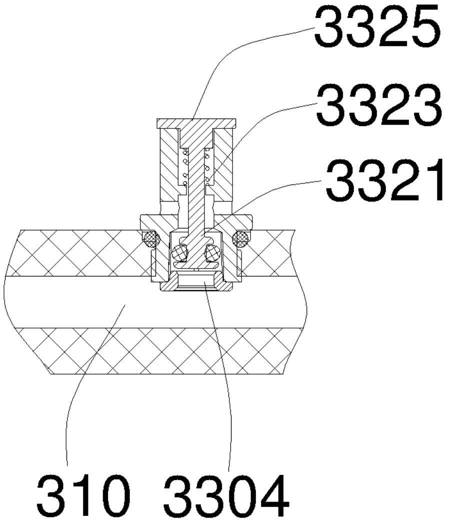
FIG. 12 is a schematic structural diagram of the exhaust valve in the handheld high-pressure cleaning machine shown in FIG. 1 in an open state in a fourth embodiment.
Figure 13:
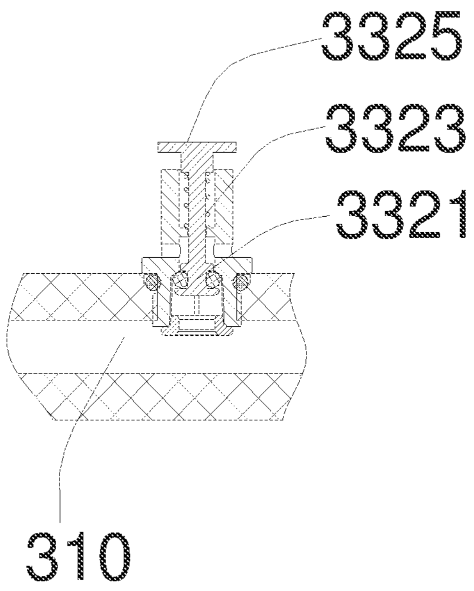
FIG. 13 is a schematic structural diagram of the exhaust valve in the handheld high-pressure cleaning machine shown in FIG. 12 in a closed state in the fourth embodiment.

Referring to FIG. 12 and FIG. 13, in a fourth embodiment, the valve core 332 includes the core body 3321, the reset member 3323, and a valve stem 3325 connected to the core body 3321. The core body 3321 is slidably accommodated in the first cavity 3311 in a direction toward or away from the second cavity 3312. The valve stem 3325 movably passes through the second cavity 3312 in an axial direction of the valve stem and protrudes from the main body 31. The reset member 3323 is sleeved in the valve stem 3325 and abuts between the valve seat 330 and the valve stem 3325, to provide the valve core 332 with a restoring force from the closed position to the open position. That is, in this embodiment, the exposed valve stem 3325 is used to manually control opening or closing of the core body 3321 relative to the valve cavity 3302.

In the foregoing first to fourth embodiments, a gap is provided between an outer contour of the air inlet hole 3304 and an outer contour of a cross section where the core body 3321 at the open position contacts the air inlet hole 3304. That is, the shape of the air inlet hole 3304 does not completely match the shape of the core body 3321, and there is an air inlet gap between the air inlet hole and the core body. Preferably, the air inlet hole 3304 is a polygonal hole, for example, a hexagonal hole or an octagonal hole, so that even when the core body 3321 blocks the air inlet hole 3304, the core body and the air inlet hole are not completely sealed, thereby avoiding a failure in the exhaust function.

In the nozzle device 30 of the handheld high-pressure cleaning machine 100, different embodiments of the main body 31 and different embodiments of the exhaust valve 33 may be randomly combined as required, provided that corresponding functions are normally implemented. The combination manner of different embodiments of the main body and the exhaust valve is not limited herein.

In the handheld high-pressure cleaning machine 100 provided in this application, the exhaust valve 33 is provided, and the exhaust valve 33 implements an exhaust function at the open position, to meet a requirement of vacuum in the pump, and the exhaust valve 33 implements a water outlet function at the closed position, thereby implementing self-suction and ensuring that a pressure anomaly is quickly eliminated within a short time during use, to meet a use requirement.

The foregoing embodiments merely describe several implementations of the present invention and are described in detail, but cannot be construed as a limitation to the patent scope of the present invention. It should be noted that, a person of ordinary skill in the art may further make some variations and improvements without departing from the concept of the present invention, which shall fall within the protection scope of the present invention. Therefore, the protection scope of the patent of the present invention shall be subject to the appended claims.

What is claimed is:

1. A nozzle device applied to a high-pressure cleaning machine, comprising:

a nozzle, comprising a nozzle casing, wherein a water outlet channel is provided in the nozzle casing, and a front end of the nozzle casing is provided with at least one liquid discharge port connecting with the water outlet channel, wherein the nozzle device further comprises an exhaust valve connected to the nozzle casing, and the exhaust valve comprises:

a valve seat, provided with a valve cavity capable of connecting with the water outlet channel; and a valve core, arranged in the valve cavity and movable relative to the valve cavity; wherein the valve seat is provided with an air inlet hole and an air outlet hole, the air inlet hole connects with the water outlet channel and the valve cavity, the air outlet hole connects with the valve cavity, and the air inlet hole, the valve cavity, and the air outlet hole together form a main exhaust passage connecting with external air and the water outlet channel; the nozzle device further comprises an exhaust port capable of discharging gas that enters the main exhaust passage to the outside; and the valve core is movable relative to the valve cavity to a closed position for blocking the main exhaust passage and an open position for opening the main exhaust passage.

2. The nozzle device applied to a high-pressure cleaning machine according to claim 1, wherein the exhaust port and the air outlet hole are integrated, or the exhaust port and the air outlet hole are independent of each other and the exhaust port is provided in the nozzle casing.

3. The nozzle device applied to a high-pressure cleaning machine according to claim 2, wherein a central axis of the exhaust port is basically parallel or perpendicular to a central axis of the liquid discharge port.

4. The nozzle device applied to a high-pressure cleaning machine according to claim 2, wherein an opening of the exhaust port and an opening of the liquid discharge port face a same side.

5. The nozzle device applied to a high-pressure cleaning machine according to claim 1, wherein the nozzle casing comprises a body and a cover body with a central axis, the cover body is circumferentially rotatably joined outside the body around the central axis, the cover body is provided with the liquid discharge port, the water outlet channel is provided in the body, and the exhaust valve is arranged in the body.

6. The nozzle device applied to a high-pressure cleaning machine according to claim 5, wherein the air outlet hole and the exhaust port are independently arranged, there are a plurality of exhaust ports, the plurality of exhaust ports are circumferentially arranged on the cover body around the central axis, there are a plurality of liquid discharge ports, the plurality of liquid discharge ports are circumferentially arranged on the cover body around the central axis, the cover body is operable to rotate circumferentially around the central axis to select one of the plurality of liquid discharge ports to connect with the water outlet channel, and in this case, one of the exhaust ports connects with the air outlet hole.

7. The nozzle device applied to a high-pressure cleaning machine according to claim 1, wherein the nozzle casing comprises a body and a cover body with a central axis, the cover body is circumferentially rotatably joined outside the body around the central axis, the cover body is provided with the liquid discharge port, the water outlet channel is provided in the body, and the exhaust valve is arranged in the cover body.

8. The nozzle device applied to a high-pressure cleaning machine according to claim 7, wherein there are a plurality of exhaust ports, the plurality of exhaust ports are circumferentially arranged on the cover body around the central axis, a plurality of exhaust valves and liquid discharge ports are arranged in one-to-one correspondence, there are a plurality of liquid discharge ports, the plurality of liquid discharge ports are circumferentially arranged on the cover body around the central axis, the cover body is operable to rotate circumferentially around the central axis to select one of the plurality of liquid discharge ports to connect with the water outlet channel, and in this case, one of the exhaust ports connects with the air outlet hole.

9. The nozzle device applied to a high-pressure cleaning machine according to claim 1, wherein the nozzle device comprises a spray rod, the spray rod is arranged between the nozzle and the high-pressure cleaning machine, and the water outlet channel extends from the spray rod to the nozzle.

10. The nozzle device applied to a high-pressure cleaning machine according to claim 1, wherein the valve core comprises a core body and a reset member, and a gap is provided between the air inlet hole and the core body at the open position.

11. The nozzle device applied to a high-pressure cleaning machine according to claim 1, wherein the high-pressure cleaning machine is a handheld high-pressure cleaning machine, the handheld high-pressure cleaning machine comprises a handheld portion, a motor, and a water pump driven by the motor, the motor and the water pump are both arranged in the handheld portion, and the nozzle device is joined to the handheld portion.

12. A handheld high-pressure cleaning machine, comprising a handheld portion, a motor, a water pump driven by the motor, and a nozzle device, wherein the motor and the water pump are both arranged in the handheld portion, the nozzle device is joined to the handheld portion, and the nozzle device comprises:

a main body, wherein a water outlet channel is provided in the main body, and a front end of the main body is provided with at least one liquid discharge port connecting with the water outlet channel; and an exhaust valve, arranged on a path between a liquid outlet of the water pump and the liquid discharge port of the nozzle, wherein the exhaust valve comprises:

a valve seat, provided with a valve cavity capable of connecting with the water outlet channel; and a valve core, movably arranged in the valve cavity; wherein the valve seat is provided with an air inlet hole and an air outlet hole, the air inlet hole connects with the water outlet channel and the valve cavity, the air outlet hole connects with the valve cavity, and the air inlet hole, the valve cavity, and the air outlet hole together form a main exhaust passage connecting with external air and the water outlet channel; and the valve core is movable relative to the valve cavity to a closed position for blocking the main exhaust passage and an open position for opening the main exhaust passage.

13. The handheld high-pressure cleaning machine according to claim 12, wherein the main body comprises a nozzle and a spray rod connecting the nozzle and the handheld portion, the water outlet channel extends from the spray rod to the nozzle, the exhaust valve is assembled on the spray rod, and the air outlet hole is exposed from the spray rod.

14. The handheld high-pressure cleaning machine according to claim 12, wherein the main body comprises a nozzle, the nozzle comprises a nozzle casing, the water outlet channel is provided in the nozzle casing, and a front end of the nozzle casing is provided with at least one liquid discharge port connecting with the water outlet channel; and the exhaust valve is assembled in the nozzle casing.

15. The handheld high-pressure cleaning machine according to claim 14, wherein the nozzle device further comprises an exhaust port capable of discharging gas that enters the main exhaust passage through the air inlet hole to the outside; and the exhaust port and the air outlet hole are integrated, or the exhaust port and the air outlet hole are independent of each other and the exhaust port is provided in the nozzle casing.

16. The handheld high-pressure cleaning machine according to claim 15, wherein a central axis of the exhaust port is basically parallel to a central axis of the liquid discharge port.

17. The handheld high-pressure cleaning machine according to claim 15, wherein an opening of the exhaust port and an opening of the liquid discharge port face a same side.

18. The handheld high-pressure cleaning machine according to claim 15, wherein the air outlet hole and the exhaust port are independently arranged, the nozzle casing comprises a body and a cover body with a central axis, the cover body is circumferentially rotatably joined outside the body around the central axis, there are a plurality of exhaust ports, the plurality of exhaust ports are circumferentially arranged on the cover body around the central axis, there are a plurality of liquid discharge ports, the plurality of liquid discharge ports are circumferentially arranged on the cover body around the central axis, the cover body is operable to rotate circumferentially around the central axis to select one of the plurality of liquid discharge ports to connect with the water outlet channel and in this case, one of the exhaust ports connects with the air outlet hole.

19. The handheld high-pressure cleaning machine according to claim 15, wherein the nozzle casing comprises a body and a cover body with a central axis, the cover body is circumferentially rotatably joined outside the body around the central axis, the cover body is provided with the liquid discharge port, the water outlet channel is provided in the body, and the exhaust valve is arranged in the cover body; and there are a plurality of exhaust ports, the plurality of exhaust ports are circumferentially arranged on the cover body around the central axis, a plurality of exhaust valves and liquid discharge ports are arranged in one-to-one correspondence, there are a plurality of liquid discharge ports, the plurality of liquid discharge ports are circumferentially arranged on the cover body around the central axis, the cover body is operable to rotate circumferentially around the central axis to select one of the plurality of liquid discharge ports to connect with the water outlet channel, and in this case, one of the exhaust ports connects with the air outlet hole.

20. The handheld high-pressure cleaning machine according to claim 12, wherein the exhaust valve is arranged in the handheld portion and located at the liquid outlet of the water pump.

* * * * *